US006241275B1

(12) United States Patent
Slagerman

(10) Patent No.: US 6,241,275 B1
(45) Date of Patent: Jun. 5, 2001

(54) FOLDABLE WHEELCHAIR AND LINK CONFIGURATION FOR FOLDABLE WHEELCHAIR

(75) Inventor: Murray G. Slagerman, Lafayette, CO (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

(21) Appl. No.: 09/332,473

(22) Filed: Jun. 14, 1999

(51) Int. Cl.[7] .......................... B62B 1/00

(52) U.S. Cl. .......................... 280/650; 280/639

(58) Field of Search .......................... 280/250.1, 639, 280/647, 650; 296/63, 65.04, 65.05, 65.06; 297/13, 440.12

(56) References Cited

U.S. PATENT DOCUMENTS 3,107,105 10/1963 Heriford .......................... 280/211
4,026,568 5/1977 Hallam .......................... 280/42
4,273,350 6/1981 Williams .......................... 280/242 WC
4,335,893 * 6/1982 Carmichael et al. .......................... 280/42
4,431,076 2/1984 Simpson .......................... 180/65 R
4,595,212 * 6/1986 Haury et al. .......................... 280/242
4,625,984 12/1986 Kitrell .......................... 280/242 WC
4,693,490 9/1987 Loodberg et al. .......................... 280/650
4,770,432 * 9/1988 Wagner .......................... 280/242
4,779,885 10/1988 Zinn .......................... 297/DIG. 4
4,805,931 * 2/1989 Slasor .......................... 280/650
4,863,181 9/1989 Howle .......................... 280/250.1
5,197,559 * 3/1993 Garin, III et al. .......................... 180/65.1
5,240,276 8/1993 Coombs .......................... 280/647
5,244,222 * 9/1993 Benoit .......................... 280/250.1
5,285,535 * 2/1994 Stewart et al. .......................... 4/480
5,348,336 * 9/1994 Fernie et al. .......................... 280/641
5,464,264 * 11/1995 Wilson .......................... 296/37.6
6,073,958 * 6/2000 Gagnon .......................... 280/650

FOREIGN PATENT DOCUMENTS

2474426 * 7/1981 (FR) .
10099377 * 4/1998 (JP) .

* cited by examiner

*Primary Examiner*—Paul N. Dickson
*Assistant Examiner*—Daniel Yeagley
(74) *Attorney, Agent, or Firm*—MacMillan, Sobanski & Todd, LLC

(57) ABSTRACT

A link configuration for a wheelchair having laterally spaced side frames comprises a plurality of links extending between the wheelchair side frames. Each link has opposing ends. One of the ends of each link is pivotally coupled to one of the side frames. The other end of each link is pivotally coupled to the other side frame. Each link has a hinge to permit the links to fold. The links are foldable in non-parallel planes relative to one another. An interference member coupled to the hinge of one of the links is engageable with the hinge of the other link upon unfolding the links to couple the links together.

16 Claims, 10 Drawing Sheets

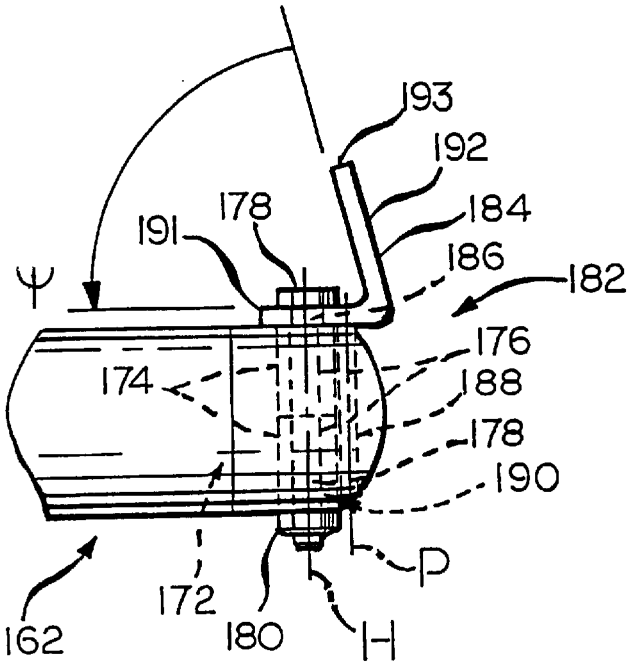
FIG. 5
FIG. 6
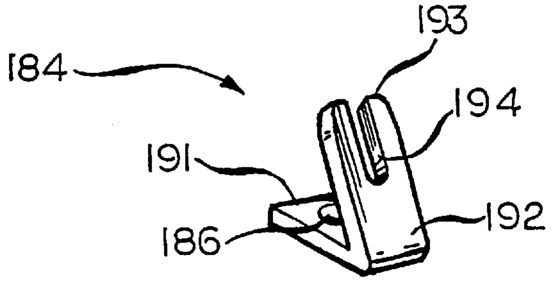

FOLDABLE WHEELCHAIR AND LINK CONFIGURATION FOR FOLDABLE WHEELCHAIR

BACKGROUND

Foldable wheelchairs generally comprise cross-tubes pivotally mounted between the wheelchair side frames. The cross-tubes generally form a scissors-like arrangement that requires the side frames to be arranged parallel to one another. This parallel arrangement is usually not well suited for withstanding lateral deflection resulting from lateral loading. Moreover, the physical requirements of the cross-tubes affect the dimensions within which the wheelchair may be folded.

Foldable panels or struts may be used in the place of cross-tubes. Foldable panels and struts may be used in combination with one another. For example, a foldable seat panel is commonly used in combination with a foldable strut. Foldable panels and struts generally employ a variety of centering and locking configurations used to lock the panels and struts in an unfolded position to prevent the panels and struts from inadvertently folding. Centering and locking configurations are often cumbersome and typically require the performance of a series of steps to be implemented.

A simple, lightweight and dependable low-cost link configuration capable of withstanding lateral deflection is needed.

SUMMARY

The invention is directed to a link configuration that satisfies the foregoing as well as other needs. A link configuration for a wheelchair having laterally spaced side frames comprises a plurality of links extending between the wheelchair side frames. Each link has opposing ends. One of the ends of each link is pivotally coupled to one of the side frames. The other end of each link is pivotally coupled to the other side frame. Each link has a hinge to permit the links to fold. The links are foldable in non-parallel planes relative to one another. An interference member coupled to the hinge of one of the links is engageable with the hinge of the other link upon unfolding the links to couple the links together.

BRIEF DESCRIPTION OF THE DRAWINGS

FIG. 5 is a partial side elevational view of the link shown in FIGS. 2 through 4, with features of the end cap and a centering and locking assembly of the link shown in hidden line.

FIG. 6 is a front perspective view of a swivel bracket forming a part of the centering and locking assembly shown in FIG. 5.

DESCRIPTION

Figure 1:
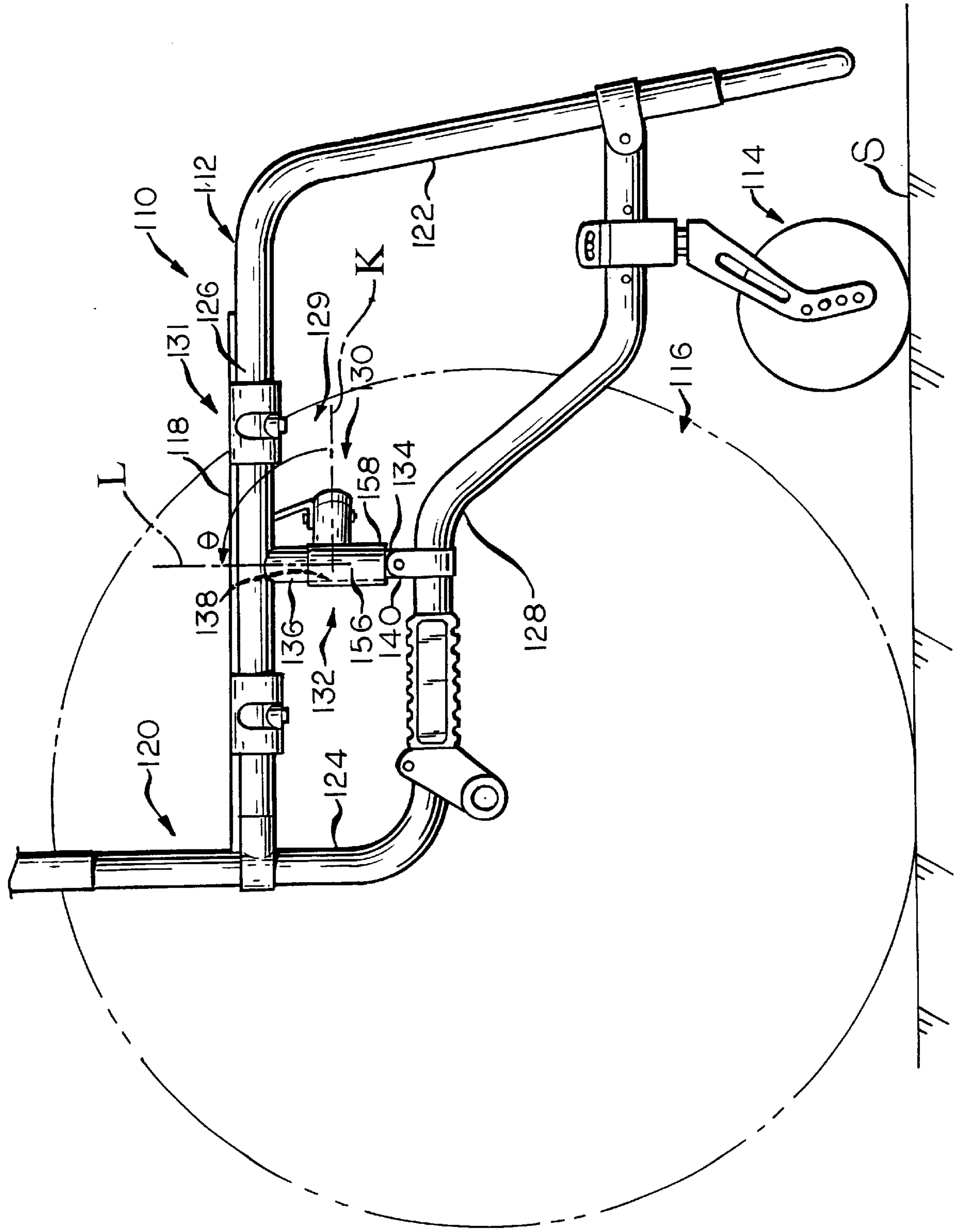
FIG. 1 is a partial side elevational view and partial schematic representation of a wheelchair having a link configuration according to the present invention.

Referring now to the drawings, there is illustrated in FIG. 1 a wheelchair 110. The wheelchair 110 comprises a pair of longitudinally extending, laterally spaced side frames 112. To simplify the description, only one of the side frames 112 is shown. The side frames 112 are supported on a supporting surface S by a pair of opposing front wheels or casters 114 and a pair of opposing rear drive wheels 116. Only one of the front casters 114 and rear wheels 116 is schematically represented. The side frames 112 support a laterally extending seat panel 118 and a seat back, generally indicated at 120. The seat back 120 extends both vertically and laterally.

Each side frame 112 comprises a front frame tube 122, a rear frame tube 124, an upper frame tube or seat tube 126, and a lower frame tube 128. The front frame tube 122 and the rear frame tube 124 are preferably longitudinally or horizontally spaced and preferably lie in a common vertical plane. The seat tube 126 and the lower frame tube 128 are preferably vertically spaced and preferably lie in a common horizontal plane.

The present invention is directed to a foldable link configuration, generally indicated at 129. The link configuration 129 includes a plurality of pivotable links having opposing ends which are cooperatively structured and dimensioned to be pivotally coupled or linked the to wheelchair side frames 112. The pivotable links are arranged to fold in planes at an angle θ relative to one another. The links are most preferably center-pivoting links that fold in non-parallel planes.

According to one embodiment of the present invention, the links include a foldable seat panel 118 and strut 130. The seat panel 118 and strut 130 each preferably have a central hinge, namely, a seat panel hinge 200 (shown in FIG. 8) and a strut hinge 172 (shown in hidden line in FIG. 5). The seat panel hinge 200 (shown in FIG. 8) is preferably foldable upwardly and a strut hinge 172 (shown in FIG. 5) is preferably foldable in a forward direction to control the folding operation of the wheelchair 110. It should be understood that the hinges 200 and 172 could fold in other directions. The strut 130 may fold in a plane, such as the horizontal plane along the line K in FIG. 1, and the seat panel 118 may fold in a plane, such as the vertical plane along the line L in FIG. 1. The angle θ between the planes in which the links fold from about 1 to about 90 degrees. The greater the angle θ, the greater the ability of the link configuration 129 to withstand lateral deflection from lateral loading. It is preferred that the angle θ between the planes be greater than 45 degrees, and most preferably, about 90 degrees.

Figure 2:
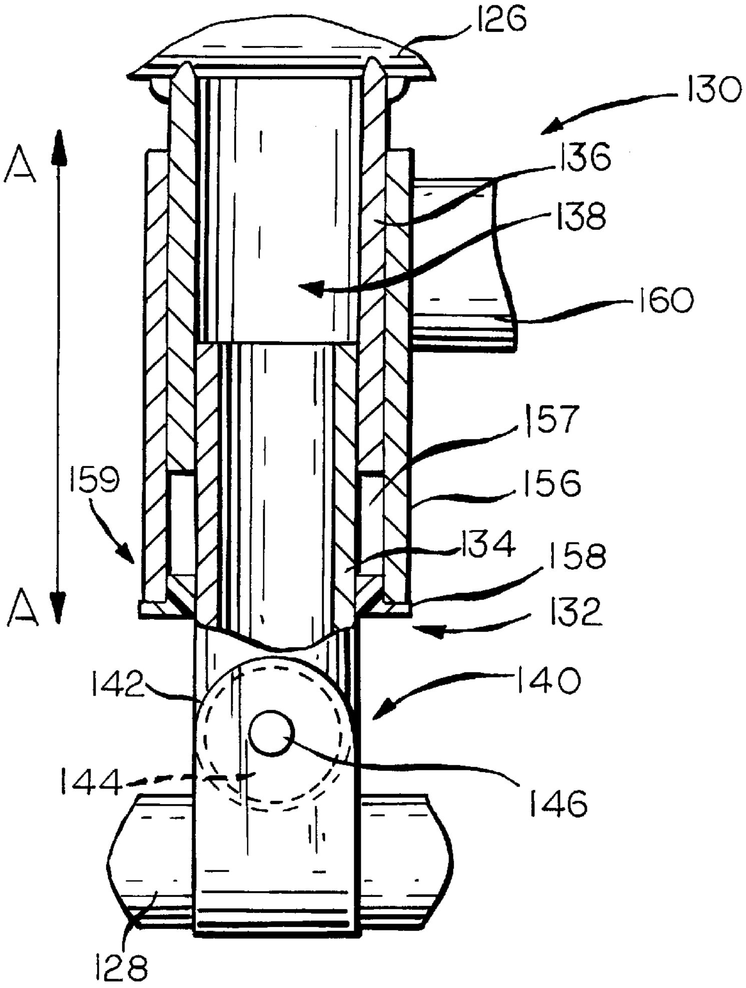
FIG. 2 is a partial cross-sectional, partial elevational view of a link according to the invention and a support tube for use with the link, with a saddle washer for use with the support tube shown in hidden line.

A support tube, such as the telescopic tube assembly 132 shown, can be vertically disposed between the seat tube 126 and the lower frame tube 128 and preferably lies in a plane common to, or defined by, the front frame tube 122, the rear frame tube 124, the seat tube 126, and the lower frame tube 128. As is shown in FIG. 2, the telescopic tube assembly 132 includes an inner tube 134 and an outer sleeve 136. The inner tube 134 is slidably engageable within an axial bore 138 defined by the outer sleeve 136. An upper end of the outer sleeve 136 can be substantially perpendicularly attached to a lower surface of the seat tube 126. The lower end of the inner tube 134 can be attached to the lower frame tube 128, such as by the tube clamp 140 shown. The upper end of the inner tube 134 can be slidably and axially arranged within the outer sleeve 136.

The tube clamp 140 shown is substantially U-shaped in construction and has two legs 142 (only one of which is shown). The legs 142 are spaced from one another. The inner tube 134 can be received between the legs 142. The legs 142 can be sufficiently spaced so as to permit a saddle washer 144 (shown in hidden line) to fit between the inner tube 134 and each leg 142 (only one saddle washer 144 is shown).

The inner tube 134, the saddle washers 144, and the legs 142 can be provided with coaligning holes 146 for receiving a fastener, such as a hex cap screw (not shown). A lock nut (also not shown) may be threadably engageable with the hex cap screw. The lock nut may be tightened sufficiently to clamp the lower frame tube 128 and the inner tube 134 between the legs 142.

The telescopic tube assembly 132 shown is provided to readily accommodate an opposing end of the strut 130 defined by a strut collar or pivot 156, which will be described in greater detail in the description that follows. It should be understood that the foregoing telescopic tube assembly 132 is described for illustrative purposes. The telescopic tube assembly 132 is provided to enable the distance between the seat tube 126 and the lower frame tube 128 to be adjusted to permit the inclination or elevation of the seat tube 126 to be adjusted. Other arrangements, such as a single support tube (not shown) extending between the seat tube 126 and the lower frame tube 128, may be suitable for carrying out the invention. It should be understood that the other supports for pivotally supporting the strut 130 relative to the side frame 112 may also be suitable for carrying out the invention.

The strut collar or pivot 156 can include an axial bore 157 dimensioned to receive the telescopic tube assembly 132. The strut collar 156 can also be slidably engageable with the telescopic tube assembly 132 so as to be displaceable along the line A—A. Moreover, the strut collar 156 can have an inside diameter that is substantially equivalent to the outside diameter of the outer sleeve 136. As shown in the drawings, an annular space may be located between the strut collar 156 and the inner tube 134 at the lower end 159 of the strut collar 156. A ring 158 can be inserted in this annular space to maintain an axial relationship between the inner tube 134 and the lower end 159 of the strut collar 156.

Figure 3:
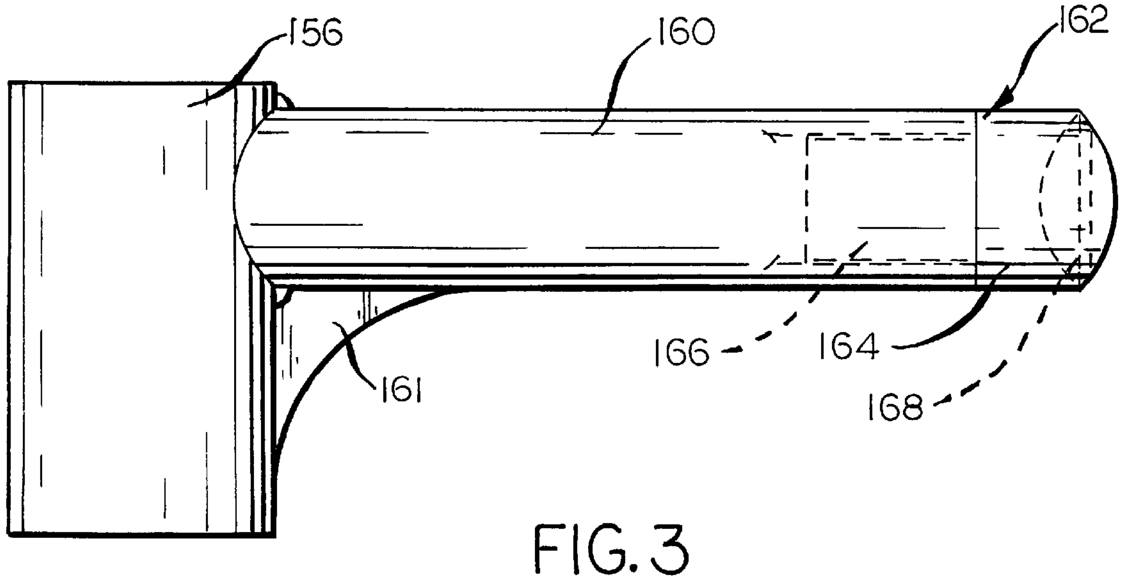
FIG. 3 is a partial front elevational view of the link shown in-part in FIG. 2, with inner walls of a strut tube and features of an end cap of the link at least partially shown in hidden line.
Figure 4:
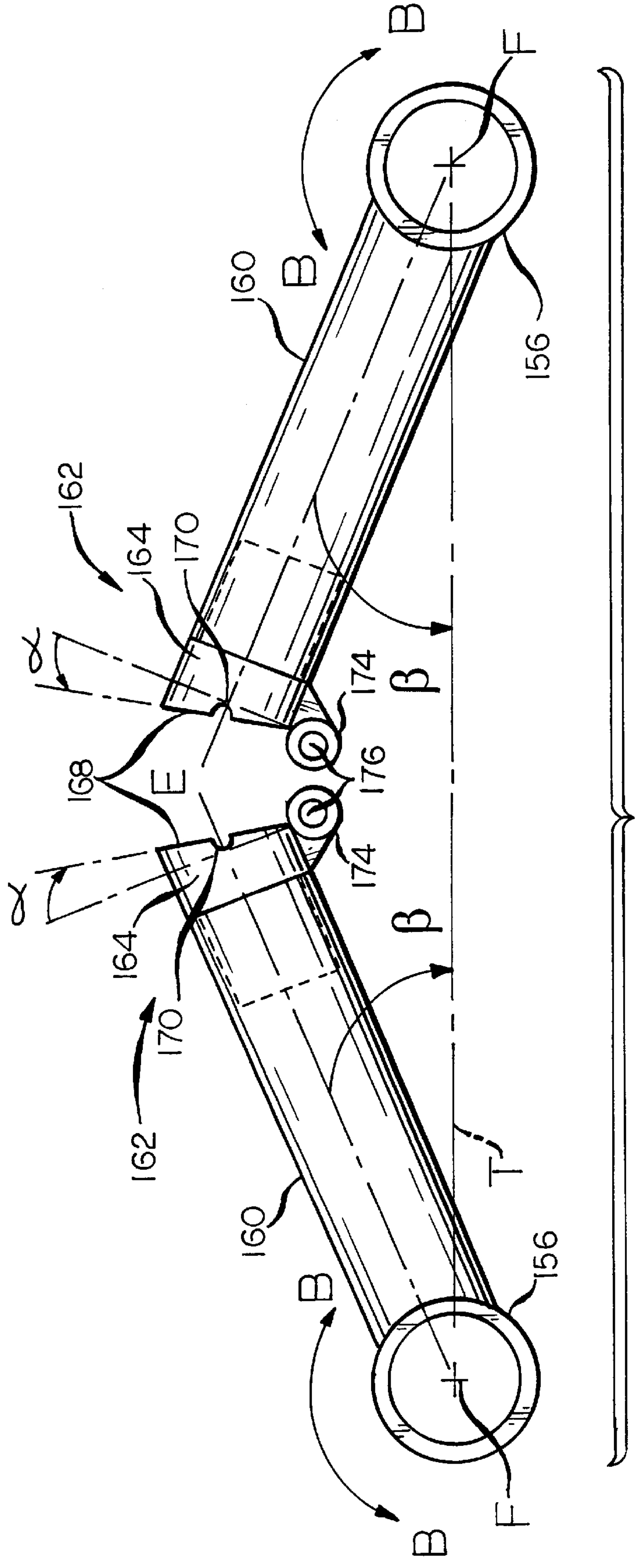
FIG. 4 is a partial, partially exploded bottom plan view of the link shown in-part in FIGS. 2 and 3, with features of the end cap of the link shown in hidden line.

As shown in FIGS. 3 and 4, the strut 130 may include a plurality of parts, such as a first part and a second part each defined by a corresponding one of the strut tubes 160 shown. Each strut tube 160 can extend perpendicularly from a strut collar 156. The strut tubes 160 are preferably rigidly connected to the strut collars 156, such as by welding the strut collars 156 and the strut tubes 160 together. A structural web 161 may be rigidly connected between the strut collars 156 and the strut tubes 160 to increase the structural integrity of the foldable strut 130 (shown in side elevation in FIG. 1).

The strut tubes 160 may each have an end 162 provided with an angled abutment surface 168. The abutment surfaces 168 may abut one another upon the strut 130. The abutment surfaces 168 may be supported at the ends 162 of the strut tubes 160 in any suitable manner. For example, the end 162 of each strut tube 160 may be provided with an opening (shown but not referenced), thus making the end 162 an open end. The opening may be dimensioned to receive an end cap 164. More particularly, a plug 166 may be an integral part of the end cap 164, and the plug 166 may be insertable into the opening.

As illustrated in FIG. 4, each end cap 164 may support one of the angled surfaces 168. The angle α of each angled surface 168 is preferably equivalent to the angle β between the central axis E of the strut tube 160 and a transverse axis T extending through the focal points F of the opposing strut collars 156. The angle α is preferably an angle which allows substantially unfolding, but prevents the strut tubes 160 from completely unfolding into coaxial alignment with one another, or from coaxially aligning with one another.

Each angled surface 168 is preferably provided with a slot 170. The slots 170 are preferably semi-cylindrical. The semi-cylindrical slots 170 preferably extend substantially vertically. The semi-circular slots 170 may be transverse with the axis E of the strut tube 160 as shown in FIG. 4. The purpose of the semi-circular slots 170 will become more apparent in the description that follows.

The strut 130 is preferably adapted to fold in a substantially horizontal plane. This may be accomplished through the aid of a hinge, such as strut hinge 172 shown in hidden line in FIG. 5. The strut hinge 172 may be formed by a hub 174 projecting from each end cap 164. Each hub 174 may have a hole 176. The holes 176 in the hubs 174 preferably coalign when the hubs 174 are arranged to overlap one another. The coaligning holes 176 are preferably dimensioned to receive a hinge pin, such as the hex cap screw 178 shown in FIG. 5. A lock nut 180 may be threadably engageable with the hex cap screw 178 to hold the hubs 174 together to form the strut hinge 172 for pivotally coupling or joining the end caps 164, and thus, coupling or joining the ends 162 of the first and second strut tubes 160 to permit the strut tubes 160 to fold and unfold relative to one another and thus permit the strut 130 to fold and unfold.

Continuing with reference to FIG. 5, there is an interference member in the form of a centering and locking assembly 182. The centering and locking assembly 182 can comprise a swivel bracket 184. The swivel bracket 184 may be provided with a hole 186 through which the hex cap screw 178 holding the hubs 174 together may pass.

As shown in the drawing, the swivel bracket 184 may be arranged juxtaposed the upper hub 174. The hole 186 in the swivel bracket 184 may be arranged to coalign with the coaligning holes 176 in the overlapping hubs 174. With the swivel bracket 184 arranged in this manner, the hex cap screw 178 may be inserted into and through the coaligning holes 176 and 186 and the lock nut 180 may be tightened onto the hex cap screw 178 to pivotally couple the hubs 174 and the swivel bracket 184 together.

A centering element or device, such as the centering pin 188 shown in hidden line, extends downward from the bottom of the swivel bracket 184. Upon unfolding the foldable strut 130 (shown in FIG. 1), the two opposing end caps 164 (shown in FIG. 4) converge and the semi-cylindrical slots 170 cooperatively form a cylindrical bore or opening 190 (shown in FIG. 5 in hidden line). The axis or focal point P of the centering pin 188 is spaced a predetermined distance from the axis or focal point H of the strut hinge 172 and is preferably coaxial with the axis or focal point (also designated as P) of the cylindrical bore 190.

As the foldable strut 130 (shown in FIG. 1) unfolds, the swivel bracket 184 is preferably permitted to swivel so as to engage at least one of the semi-cylindrical slots 170. The semi-circular slot 170 may then guide the centering pin 188 to the other semi-circular slot 170. As the foldable strut 130 completely unfolds, the two end caps 164 (shown in FIG. 4) abut or come into contact with one another and the cylindrical bore 190 is formed by the two semi-circular slots 170. The centering pin 188 is captured or trapped in the cylindrical bore 190, which is preferably horizontally centered along the end cap 164. The cooperative engagement between the centering pin 188 and the cylindrical bore 190 centers the swivel bracket 184 in a substantially fixed position relative to the strut 130 or the strut hinge 172. This preferably centers the swivel bracket 184 in a substantially fixed position relative to the seat panel 118 or the seat panel hinge pin 205 (shown in FIG. 8). Most preferably, the swivel bracket 184 is centered laterally substantially between the side frames 112.

As shown in FIG. 6, the swivel bracket 184 may include two legs 191 and 192 arranged in a substantially L-shaped configuration, thus defining an L-shaped part. A substantially horizontally extending leg 191 may be provided with the hole 186 through which may pass the hinge pin or hex cap screw 178. As shown in the drawing, an upwardly extending leg 192 has an upper edge 193. A fork or slot 194 may originate from the upper edge 193 and extend downward. The slot 194 is preferably engageable with the seat panel 118 or the seat panel hinge pin 205 (shown in FIG. 8), as will become more apparent in the description that follows.

Figure 7:
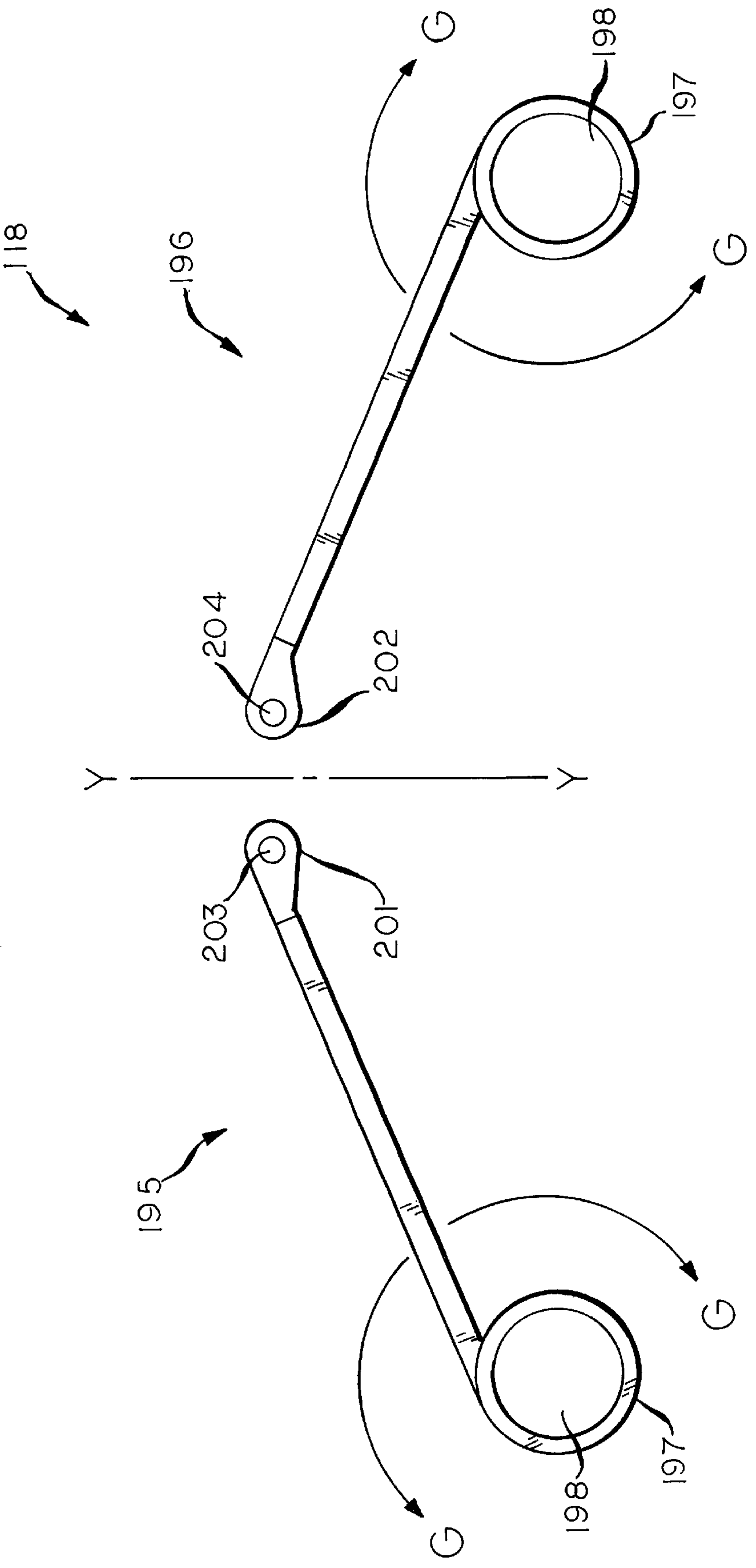
FIG. 7 is a partial, partially exploded side elevational view of another link according to the invention.
Figure 8:
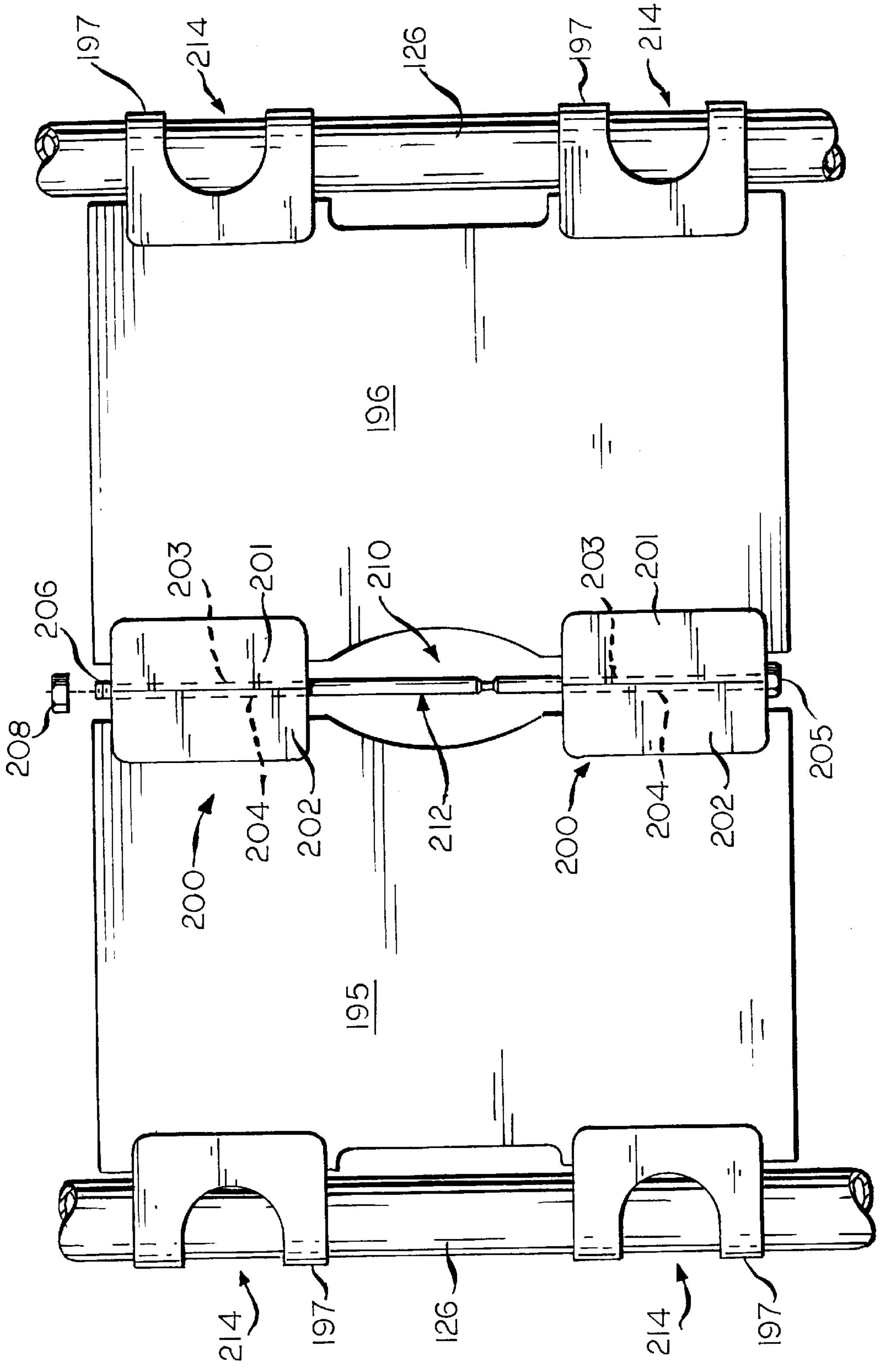
FIG. 8 is a partially exploded top plan view of the link shown in FIG. 7, a partial top plan view of opposing wheelchair seat tubes, with coaligning strut hinge holes shown in hidden line.

As shown in FIGS. 7 and 8, the seat panel 118 may be comprised of two panel sections 195 and 196 arranged adjacent to one another. Each panel section 195 and 196 may include opposing ends defined in part by a set of longitudinally spaced collars or pivots 197. Each seat panel collar 197 preferably has an axial bore 198 through which a seat tube 126 (shown in FIG. 8) may be inserted. It is preferable that two seat panel collars 197 pivotally couple each panel section 195 and 196 to a respective seat tube 126. The seat panel collars 197 are pivotable relative to the seat tubes 126 to permit the panel sections 195 and 196 to pivot along the lines G—G (shown in FIG. 7) relative to the seat tubes 126.

Continuing with reference to FIG. 8, there is illustrated a set of longitudinally spaced seat panel hinges, generally indicated at 200, formed by a set of hubs 201 and 202 projecting from adjacent ends of the panel sections 195 and 196 opposite the opposite ends formed in part by the set of seat panel collars 197. Each hub 201 and 202 preferably has a hole 203 and 204. One set of hubs 201 may coalign with another set of hubs 202. The holes 203 and 204 (shown in hidden line) in the coaligning hubs 201 and 202 likewise coalign. An elongated seat panel hinge pin 205 may be inserted into and through the coaligning holes 203 and 204. The seat panel hinge pin 205 is preferably provided with a threaded end 206. A lock nut 208 may be engageable with the threaded end 206 of the seat panel hinge pin 205 to retain the seat panel hinge pin 205 in the coaligning holes 203 and 204, and thus, form the set of seat panel hinges 200 for pivotally coupling or joining the seat panel sections 195 and 196 together.

An opening 210 may be provided between the set of seat panel hinges 200. A portion of the seat panel hinge pin 205 extending through the opening 210 may define a handle region 212 of the seat panel hinge pin 205. The handle region 212 may be provided or used for lifting the seat panel hinge pin 205 upward, which, in turn, raises the center of the seat panel 118. That is to say, the panel sections 195 and 196 may be pivotally displaceable along the lines G—G (shown in FIG. 7) by gripping the handle region 212 of the seat panel hinge pin 205 and lifting the seat panel hinge pin 205 upward along the line Y—Y (shown in FIG. 7). In addition to facilitating the folding of the wheelchair 110, the handle region 212 of the seat panel hinge pin 205 may function as a transport handle for transporting the wheelchair 110 while in a folded posture.

Figure 9:
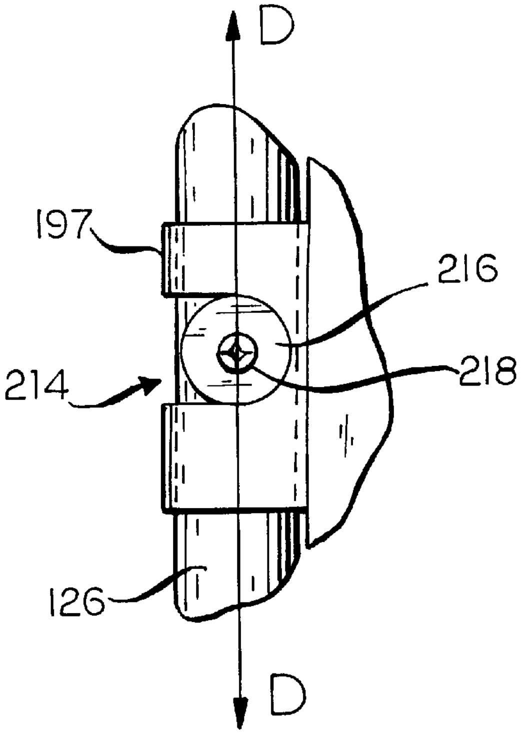
FIG. 9 is a partial bottom plan view of the link and the opposing wheelchair seat tubes shown in FIG. 7, with a guide of the link engaging a portion of the seat tubes.

Now, with reference back to FIG. 9, it is further illustrated that each seat panel collar 197 may be provided with a cutout 214 adapted to receive a retainer and guide, such as a saddle washer 216 secured to the bottom of the seat tube 126 within the confines of each cutout 214. The saddle washer 216 may be secured with any suitable fastener, such as the Philips head screw 218 shown in the drawings. The saddle washer 216 may function to retain each seat panel collar 197 in a substantially fixed axial position along the line D—D relative to the seat tubes 126. The cutouts 214 and saddle washers 216 may also cooperatively function to guide the seat panel collars 197 throughout the pivotal movement of the seat panel collars 197 along the line G—G (shown in FIG. 7). The placement of the seat panel collars 197 on the bottom of the seat tubes 126 should not interfere with the pivotal movement of the seat panel collars 197 and the respective panel sections 195 and 196 along the lines G—G.

Figure 10:
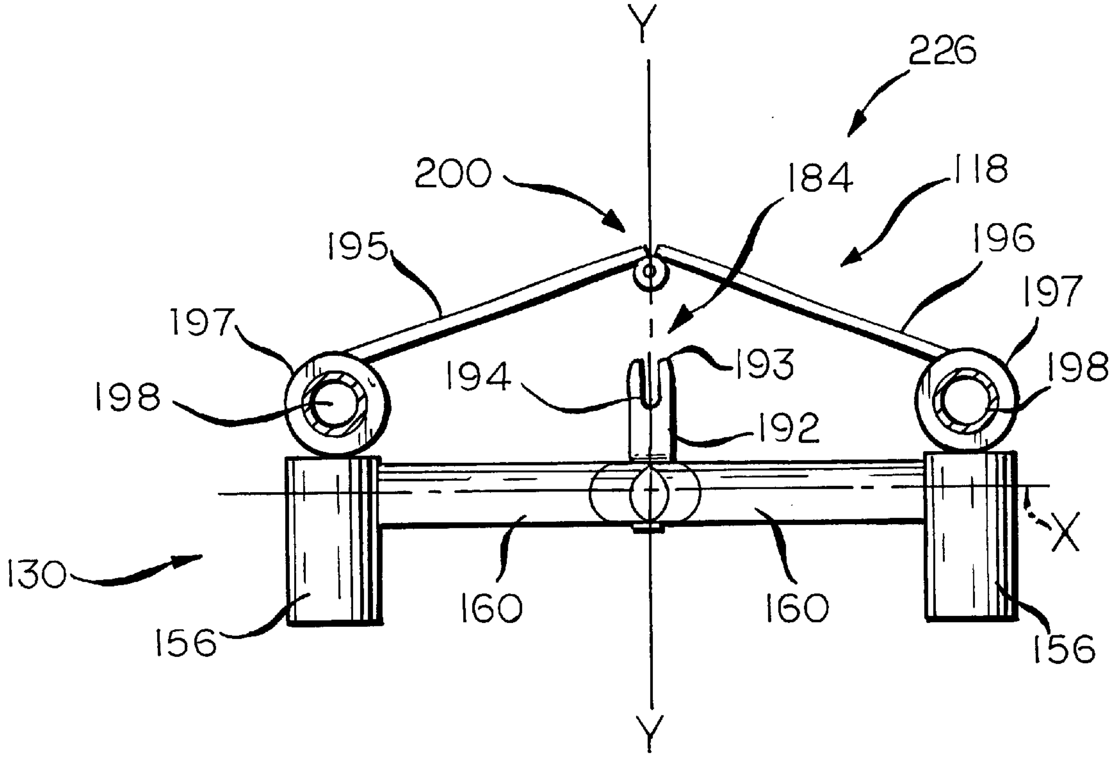
FIG. 10 is a diagrammatic representation of the links shown at least in part in FIGS. 3 through 9.
Figure 11:
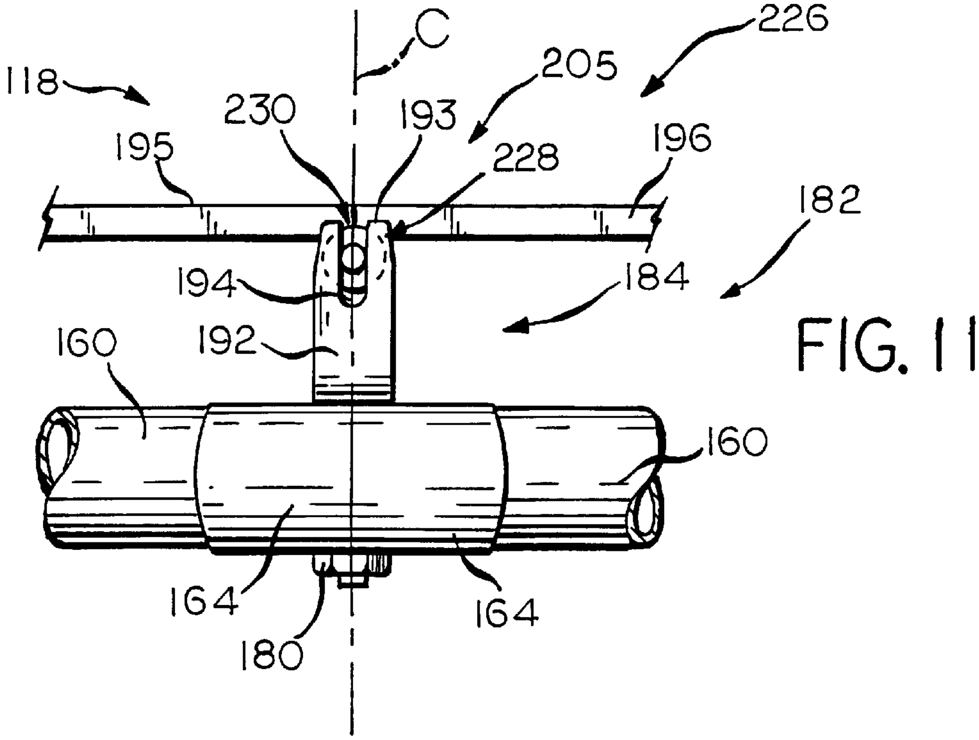
FIG. 11 is a partial front elevational view of the links shown in FIG. 10 with the links being centered and locked by the centering and locking assembly.
Figure 12:
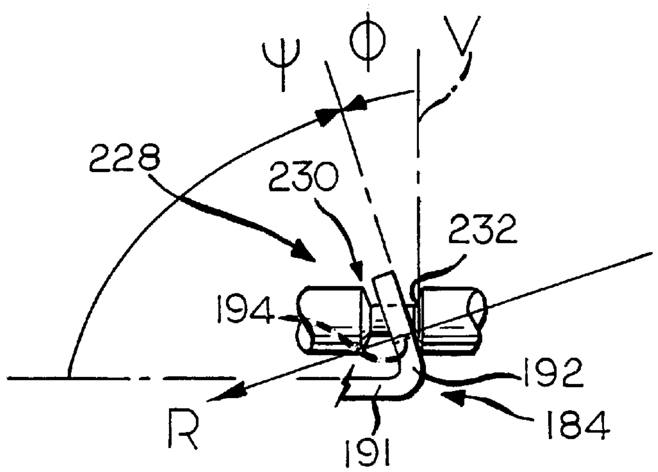
FIG. 12 is a partial side elevational view of the centering and locking assembly shown in FIG. 11.

The operation of the invention is best understood with reference to FIGS. 10 through 12. As illustrated in FIG. 10, the seat panel 118 may fold in a plane that is perpendicular to that of the foldable strut 130. It should be understood that the seat panel 118 may fold in planes other than a plane perpendicular to that of the foldable strut 130. However, it is preferable that the seat panel 118 fold in a plane that is not parallel to that of the foldable strut 130.

With regard to the embodiment shown in FIG. 10, as the handle region 212 (shown in FIG. 8) of the hinge pin 205 (also shown in FIG. 8) is raised within the substantially vertical plane along the line Y—Y, the seat panel collars 197 may pivot about the seat tubes 126 (shown in FIG. 8). The panel sections 195 and 196 may pivot upward along the lines G—G (shown in FIG. 7).

Throughout the upward movement of the seat panel 118, the collars 156 pivot about the telescopic tube assemblies 132 (shown in FIG. 4) along the lines B—B (also shown in FIG. 4) and the foldable strut 130 folds forward in a substantially horizontal plane, generally represented by the line X. The foldable seat panel 118 and the foldable strut 130 may be structured and dimensioned to permit the wheelchair 110 to be narrowly folded, and thus, occupy a minimal amount of space when in a folded posture.

The wheelchair 110 (shown in FIG. 1) may be unfolded, for example, by pushing downward on the handle region 212 (shown in FIG. 8) of the seat panel hinge pin 205 (also shown in FIG. 8) or by merely pulling the opposing side frames 112 (one of which is shown in FIG. 1) apart. As the wheelchair 110 is unfolded, the seat panel collars 197 may again pivot about the seat tubes 126 (shown in FIG. 8) along the lines G—G (shown in FIG. 7) and the panel sections 195 and 196 may pivot downward, likewise along the lines G—G. Moreover, the strut collars 156 may pivot about the telescopic tube assemblies 132 (shown in FIG. 4) along the lines B—B (shown in FIG. 4) and the foldable strut 130 may unfold rearwardly in the substantially horizontal plane X.

As the wheelchair 110 (shown in FIG. 1) is completely unfolded, the centering assembly 184 may laterally center the swivel bracket 184 along the line C (shown in FIG. 11) substantially between the side frames 112 and relative to the seat panel hinge pin 205 (shown in FIG. 8), and thus, relative to the seat panel 118. As described in the description above, upon unfolding the wheelchair 110, the swivel bracket 184 may pivot so as to permit the centering pin 188 to engage a semi-circular slot 170 (shown in FIGS. 4 and 5) in one of the end caps 164 (also shown in FIGS. 4 and 5). Continued movement of the foldable strut 130 guides the centering pin 188 toward the other semi-circular slot 170. As the end caps 164 converge and abut one another, the semi-circular slots 170 form a cylindrical bore 190 (as shown in FIG. 5 and as described above) and the centering pin 188 is ultimately captured in the cylindrical bore 190, thus centering the swivel bracket 184 along the line C relative to the seat panel hinge pin 205 (shown in FIG. 8).

Simultaneously, the seat panel hinge pin 205 (shown in FIG. 8) may be displaced downward and into engagement with the slot 194 originating at the upper edge 193 (shown in FIG. 11) of the upwardly extending leg 192 of the swivel bracket 184, as shown in FIGS. 11 and 12. The engagement of the seat panel hinge pin 205 with the slot 194 couples the seat panel 118 and the foldable strut 130 together.

As shown in FIGS. 5, 6 and 12, the upwardly extending leg 192 of the swivel bracket 184 preferably defines an abutment surface disposed at some angle ψ (shown in FIG. 12) in the range of about 0 degrees to about 90 degrees relative to the horizontally extending leg 191. It is most preferable that the angle ψ be about 60 degrees, or that the abutment surface defined by the upwardly extending leg 192 be at an angle ϕ (shown in FIG. 12) of about 30 degrees relative to a vertical axis, indicated along the line V (also shown in FIG. 12), where line V is perpendicular to the horizontally extending leg 191.

Continuing with reference to FIG. 12, the seat panel hinge pin 205 (shown in FIG. 11) may be provided with a region, generally indicated at 228, which is engageable with the slot 194 originating at the upper edge 193 (shown in FIG. 11) of the upwardly extending leg 192. This engageable region 228 may have an annular recess defined by a reduced diameter portion 230. The reduced diameter portion 230 is preferably structured and dimensioned to fit within the slot 194. The forward portion or abutment surface 232 of the engageable region 228 is preferably tapered at an angle that is substantially parallel to the angle ϕ of the upwardly extending leg 192 relative to the vertical axis V. This parallel relationship insures that adequate surface contact exists between the abutment surface 232 and the upwardly extending leg 192. A load on the seat panel 118 or a downward pressure on the seat panel hinge pin 205 (shown in FIG. 11) may produce tension between the abutment surface 232 of the seat panel hinge pin 205 and the abutment surface defined by the upwardly extending leg 192 along the line Y—Y (shown in FIG. 7) to urge the foldable strut 130 (shown in FIG. 1) rearward in the direction of the arrow R against the upwardly extending leg 192. This resists forward travel of the foldable strut 130, and thus, reduces the risk that the foldable strut 130 will inadvertently unfold.

Figure 13:
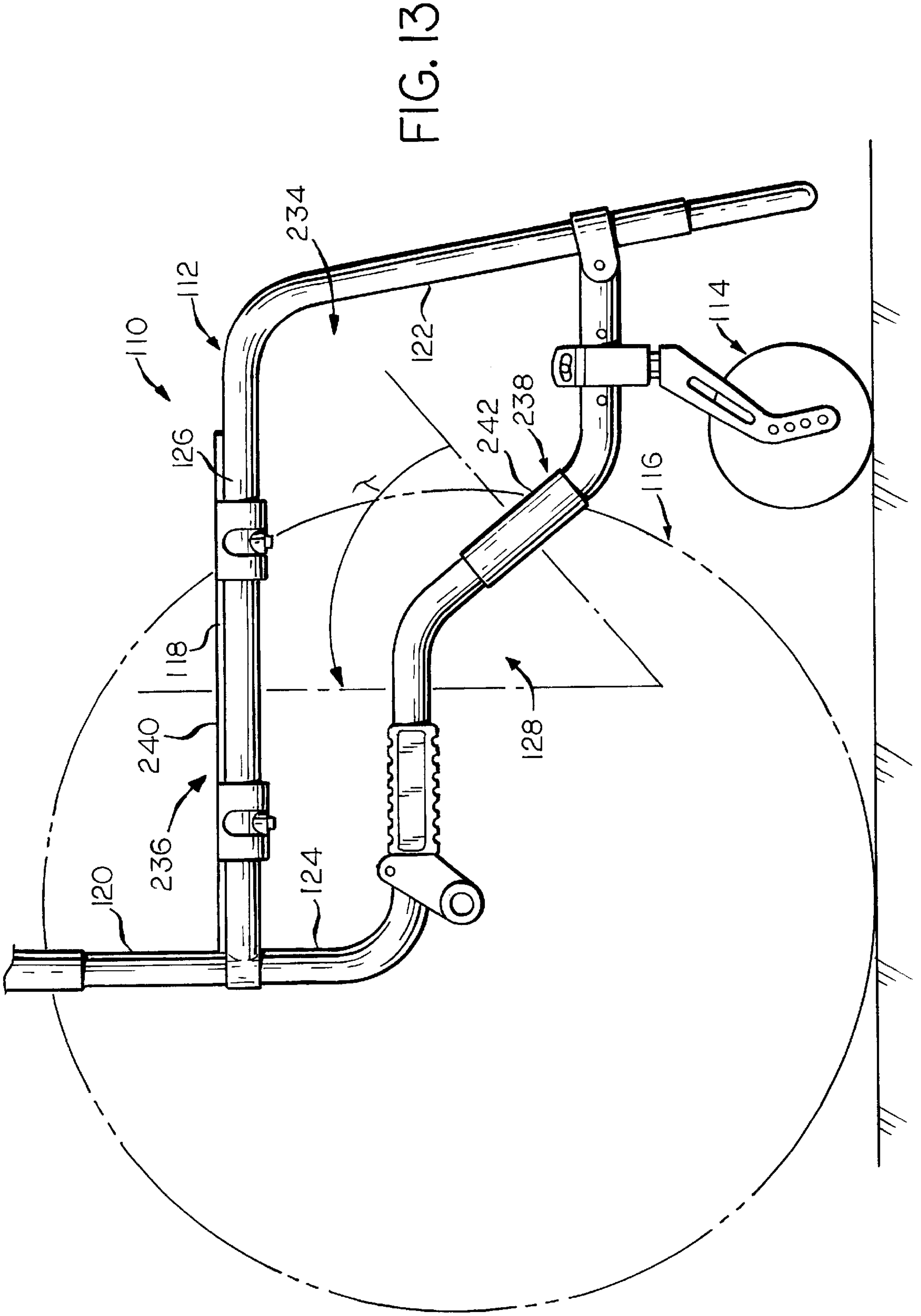
FIG. 13 is a side elevational view of a wheelchair having an alternative link configuration, and a schematic representation of a rear wheel and a front caster.
Figure 14:
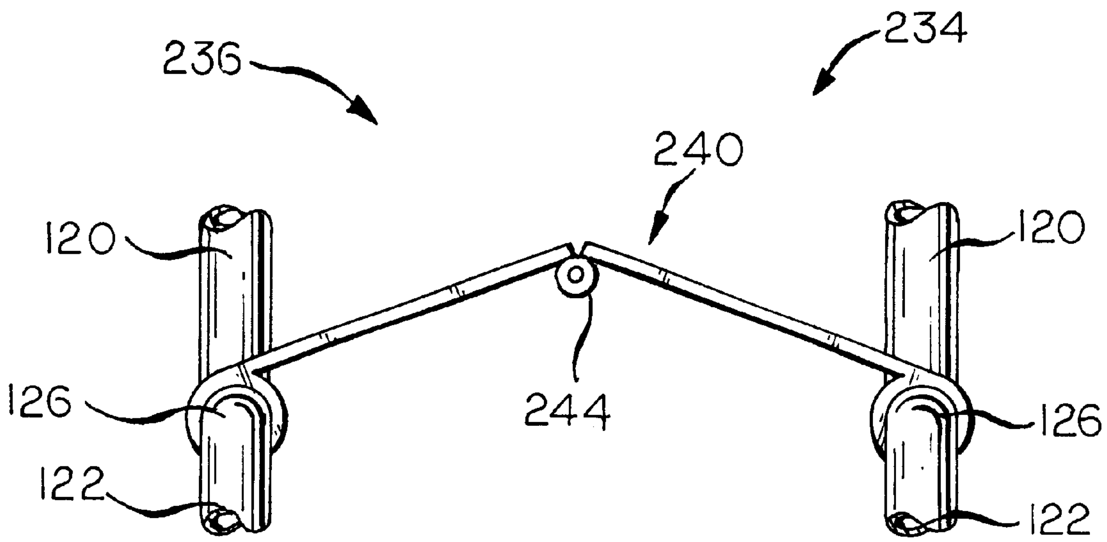
FIG. 14 is a partial, partially cutaway front elevational view of an upper portion of the wheelchair and the alternative link configuration shown in FIG. 13.
Figure 15:
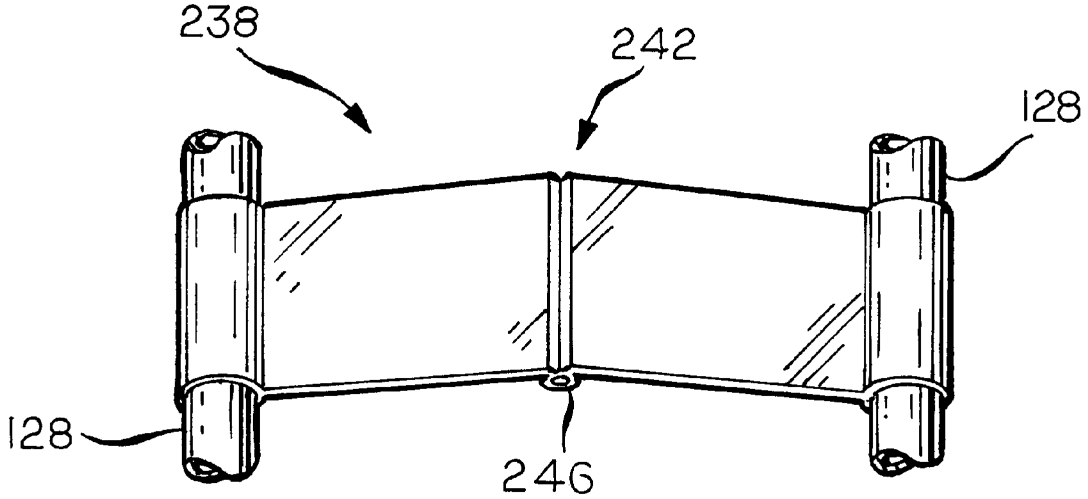
FIG. 15 is a partial, partially cutaway front elevational view of a lower portion of the wheelchair and the alternative link configuration shown in FIG. 13.

An alternative link configuration 234 is shown in FIGS. 13 and 14. This link configuration 234 includes a plurality of pivotable links 236 and 238 arranged to travel or fold in planes at an angle λ (shown in FIG. 13) relative to one another upon folding or unfolding the wheelchair 110 (also shown in FIG. 13). These links may include a foldable upper panel 240 and a foldable lower panel 242. The upper and lower panels 240 and 242 each preferably have a central hinge, including an upper panel hinge 244 (shown in FIG. 14) that is foldable upward and downward and a lower panel hinge 246 (also shown in FIG. 14) that is foldable forward and rearward at an upward angle to control the folding operation of the wheelchair. The angle λ of travel of the upper and lower panels 240 and 242 shown is preferably about 45 degrees. The upper panel 240 may be substantially equivalent to the seat panel 118 set forth above. The lower panel 242 may be substituted in place of the foldable strut, such as the foldable strut 130 described above. Although not shown, this embodiment may likewise be provided with a centering and locking assembly.

It should be clearly understood that the link configurations other than those shown and described above may be suitable for carrying out the instant invention. In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. That is to say, the present invention is not intended to be limited to the embodiments described above, but encompasses any and all embodiments within the scope of the following claims.

What is claimed is:

1. A link configuration for a wheelchair having laterally spaced side frames said link configuration comprising:

a strut extending between the wheelchair side frames, said strut having opposing ends, one of said ends of said strut being pivotally coupled to one of the side frames and the other one of said ends of said strut being pivotally coupled to the other side frame, said strut having a hinge and being adapted to fold in a substantially horizontal plane;

a seat panel extending between the wheelchair side frames, said seat panel having opposing ends, one of said ends of said seat panel being pivotally coupled to one of the side frames and the other one of said ends of said seat panel being pivotally coupled to the other side frame, said seat panel having a hinge and being adapted to fold in a substantially vertical plane; and an interference member which includes an upwardly extending fork coupled to said hinge of said strut, said fork being shaped and dimensioned to receive a portion of said hinge of said seat panel upon unfolding said seat panel and said strut to couple said hinge of said seat panel and said hinge of said strut together.

2. The link configuration of claim 1, wherein said strut includes a first part and a second part pivotally coupled together by said hinge, said first and second parts each having an abutment surface, said abutment surface of said first and second parts abutting one another upon unfolding said strut to prevent said first and second parts from co-axially aligning with one another.

3. The link configuration of claim 1, further comprising a centering pin coupled to said fork and extending substantially vertically downward, said strut being adapted to form an opening to capture said centering pin upon unfolding said seat panel and said strut to couple said fork to said hinge of said seat panel.

4. The link configuration of claim 3, wherein said strut includes a first part and a second part pivotally coupled together by said hinge of said strut, said first and second parts having an abutment surface, said abutment surface of said first and second parts abutting one another upon unfolding said strut, said abutment surfaces each comprise a substantially vertically extending, substantially semi-cylindrical slot, said centering pin being substantially cylindrical and extending substantially vertically downward from said fork, said slot in said abutment surface of said first part being adapted to coaxially align with said s lot in said abutment surface of said second part upon abutment of said abutment surfaces to form a substantially cylindrical bore for receiving said centering pin to center said fork relative to said strut.

5. A link configuration for a wheelchair having laterally spaced side frames, said link configuration comprising:

a strut extending between the wheelchair side frames, said strut having opposing ends, one of said ends of said strut being pivotally coupled to one of the side frames and the other one of said ends of said strut being pivotally coupled to the other side frame, said strut having a hinge and being adapted to fold in a substantially horizontal plane;

a seat panel extending between the wheelchair side frames, said seat panel link having opposing ends, one of said ends of said seat panel being pivotally coupled to one of the side frames and the other one of said ends of said seat panel being pivotally coupled to the other side frame, said seat panel having a hinge and being adapted to fold in a substantially vertical plane, said scat panel hinge comprising a hinge pin having an outer surface, a reduced diameter portion, and an abutment surface between said outer surface and said reduced diameter portion; and an interference member coupled to said strut hinge and engageable with said seat panel hinge upon unfolding said strut and said seat panel to couple said strut and said seat panel together, said interference member including a substantially L-shaped part having a substantially horizontally extending leg and a upwardly extending leg, said L-shaped part being pivotally coupled to said strut hinge by a strut hinge pin, said upwardly extending leg defining a fork, said fork being shaped and dimensioned to receive said reduced diameter portion of said seat panel hinge pin, said upwardly extending leg having an abutment surface adapted to engage said abutment surface of said seat panel hinge pin upon unfolding said seat panel and said strut and to produce tension between said abutment surface of said upwardly extending leg and said abutment surface of said seat panel hinge pin upon applying a load to said seat panel.

6. The link configuration of claim 5, further comprising a substantially cylindrical centering pin extending substantially vertically downward from said substantially horizontally extending leg, said strut including a first part and a second part pivotally coupled together by said hinge of said strut, said first and second parts each having an abutment surface, said abutment surface of said first and second parts abutting one another upon unfolding said first and second parts, said abutment surface of said first and second parts each comprise a substantially vertically extending, substantially semi-cylindrical slot, said slot in said abutment surface of said first part being adapted to align coaxially with said slot in said abutment surface of said second part upon abutment of said abutment surfaces in said first and second parts to form a cylindrical opening for receiving said centering pin to center said fork relative to said strut.

7. The link configuration of claim 5, further comprising a centering element coupled to said interference member and engageable with said strut for substantially centering said interference member relative to said strut and said seat panel.

8. The link configuration of claim 5, where in said abutment surface of panel hinge pin is disposed at an angle in a range of about 40 degrees to about 90 degrees relative to a horizontal axis through said seat panel hinge pin, and said upwardly extending leg of said L-shaped part is disposed at an angle in a range of about 40 degrees to 90 degrees relative to said substantially horizontally extending leg.

9. In combination:

a wheelchair having laterally spaced side frames;

a strut extending between the wheelchair side frames, said strut having opposing ends, one of said ends of said strut being pivotally coupled to one of said side frames and the other one of said ends of said strut being pivotally coupled to the other one of said side frames, said strut having a hinge formed in part by a hinge pin, said strut being adapted to fold in a substantially horizontal plane;

a seat panel extending between the wheelchair side frames, said seat panel having opposing ends, one of said ends of said seat panel being pivotally coupled to one of said side frames and the other one of said ends of said seat panel being pivotally coupled to the other one of said side frames, said seat panel having a hinge formed in part by a hinge pin, said seat panel being adapted to fold in a substantially vertical plane;

an upwardly extending fork coupled to said strut hinge and being shaped and dimensioned to receive a portion of said seat panel hinge upon unfolding said strut and said seat panel to couple said hinge of said seat panel and said hinge of said strut together; and an interference member coupled to said fork and engageable with said strut upon unfolding said strut to center said fork relative to said strut.

10. The link configuration of claim 9, wherein said interference member includes a centering pin coupled to said fork and extending substantially vertically downward, said strut being adapted to form an opening to trap said centering pin upon unfolding said seat panel and said strut to center said fork relative to said seat panel and said strut.

11. A link configuration for a wheelchair having laterally spaced side frames, said link configuration comprising:

a foldable strut extending substantially between the wheelchair side frames, said strut having opposing ends, one of said ends being pivotally coupled to one of the side frames and the other one of said ends being pivotally coupled to the other side frame, said strut further having a strut hinge formed in part by a strut hinge pin, said strut being foldable in a substantially horizontal plane;

a foldable seat panel extending between the wheelchair side frames, said seat panel having opposing ends, one of said ends of said seat panel being pivotally coupled to one of the side frames and the other one of said ends of said seat panel being pivotally coupled to the other side frame, said seat panel having a seat panel hinge formed in part by a seat panel hinge pin, said seat panel being foldable in a substantially vertical plane;

an upwardly extending fork coupled to said strut hinge, said fork being shaped and dimensioned to receive a portion of said seat panel hinge upon unfolding said seat panel and said strut to couple said seat panel hinge pin and said strut hinge pin together; and a centering pin coupled to said fork and extending substantially vertically downward, said strut being adapted to form a substantially cylindrical opening to capture said centering pin upon unfolding said seat panel and said strut to laterally center said fork relative to said strut.

12. The link configuration of claim 11, wherein said strut includes a first part and a second part each having a first end and a second end, said first end of each one of said first and second parts being pivotally coupled to a corresponding one of the side frames, said second end of said first and second parts being pivotally coupled together by said strut hinge, said second end of said first and second parts each having an abutment surface, said abutment surface of said first and second parts abutting one another upon unfolding said strut to prevent said first and second parts from aligning coaxially with one another.

13. The link configuration of claim 11, further comprising a substantially L-shaped part having a substantially horizontally extending leg and a upwardly extending leg, said L-shaped part being pivotally coupled to said strut hinge by said strut hinge pin, said fork being defined by said upwardly extending leg, said seat panel hinge pin comprising an outer surface, a reduced diameter portion, and an abutment surface between said outer surface and said reduced diameter portion, said fork being shaped and dimensioned to receive said reduced diameter portion of said seat panel hinge pin, said upwardly extending leg having an abutment surface adapted to engage said abutment surface of said seat panel hinge pin upon unfolding said seat panel and said strut and to produce tension between said abutment surface of said seat panel hinge pin and said abutment surface of said upwardly extending leg upon applying a load to said seat panel.

14. The link configuration of claim 13, wherein said strut includes a first part and a second part pivotally coupled together by said strut hinge, said first and second parts each having an abutment surface, said abutment surfaces of said first and second parts abutting one another upon unfolding said strut, said abutment surfaces of said first and second parts each comprise a substantially vertically extending, substantially semi-cylindrical slot, said centering pin being substantially cylindrical and extending substantially vertically downward from said substantially horizontally extending leg, said slot in said abutment surface of said first part being adapted to coaxially align with said slot in said abutment surface of said second part upon abutment of said abutment surfaces of said first and second parts to form a cylindrical opening for receiving said centering pin to laterally center said fork relative to said strut.

15. The link configuration of claim 13, wherein said abutment surface of said seat panel hinge pin is disposed at an angle in a range of about 0 to about 60 degrees relative to a horizontal axis through said seat panel hinge, and said abutment surface of said upwardly extending leg is disposed at an angle in a range of about 0 to 60 degrees relative to said substantially horizontally extending leg.

16. In combination:

a wheelchair having laterally spaced side frames; and a link configuration comprising:

a foldable strut extending between said wheelchair side frames, said strut having opposing ends, one of said ends being pivotally coupled to one of said side frames and the other one of said ends being pivotally coupled to the other one of said side frames, said strut further having a strut hinge formed in part by a strut hinge pin, said strut being foldable in a substantially horizontal plane;

a foldable seat panel extending between said wheelchair side frames, said seat panel having opposing ends, one of said ends of said seat panel being pivotally coupled to one of said side frames and the other one of said ends of said seat panel being pivotally coupled to the other one of said side frames, said seat panel having a seat panel hinge formed in part by a seat panel hinge pin, said seat panel being foldable in a substantially vertical plane;

an upwardly extending fork coupled to said strut hinge, said fork being shaped and dimensioned to receive a portion of said seat panel hinge upon unfolding said seat panel and said strut to couple said seat panel and said strut together; and a centering pin coupled to said fork and extending substantially vertically downward, said strut being adapted to form a cylindrical slot to capture said centering pin upon unfolding said seat panel and said strut.

* * * * *

UNITED STATES PATENT AND TRADEMARK OFFICE

CERTIFICATE OF CORRECTION

PATENT NO. : 6,241,275 B1
DATED : June 5, 2001
INVENTOR(S) : Murray G. Slagerman It is certified that error appears in the above-identified patent and that said Letters Patent is hereby corrected as shown below:

Column 9,
Line 11, after "said", change "s lot" to -- slot --.
Line 11, after "panel", delete "link".
Line 17, before "panel", change "scat" to -- seat --.
Line 26, before "upwardly", change "a" to -- an --.

Column 10,
Line 1, before, "said", change "where in" to -- wherein --.

Column 11,
Line 3, before "upwardly", change "a" to -- an --.

Signed and Sealed this

Fourteenth Day of May, 2002

*Attest:*

JAMES E. ROGAN

*Attesting Officer*

*Director of the United States Patent and Trademark Office*

UNITED STATES PATENT AND TRADEMARK OFFICE

CERTIFICATE OF CORRECTION

PATENT NO. : 6,241,275 B1
DATED : June 5, 2001
INVENTOR(S) : Murray G. Slagerman It is certified that error appears in the above-identified patent and that said Letters Patent is hereby corrected as shown below:

Column 9,
Line 17, after "said", change "s lot" to -- slot --.
Line 32, after "panel", delete "link".
Line 38, before "panel", change "scat" to -- seat --.
Line 47, before "upwardly", change "a" to -- an --.

Column 10,
Line 14, before "said", change "where in" to -- wherein --.

Column 11,
Line 30, before "upwardly", change "a" to -- an --.

This certificate supersedes Certificate of Correction issued May 14, 2002.

Signed and Sealed this

Twenty-fourth Day of December, 2002

JAMES E. ROGAN
*Director of the United States Patent and Trademark Office*